United States Patent [19]

Tassinario

[11] Patent Number: 4,568,862
[45] Date of Patent: Feb. 4, 1986

[54] COMMUTATORLESS D.C. MOTOR WITH ELECTRONIC COMMUTATION

[75] Inventor: Giampiero Tassinario, Calenzano, Italy

[73] Assignee: Mavilor Systemes, S.A., Coppet, Switzerland

[21] Appl. No.: 598,802

[22] Filed: Apr. 10, 1984

[30] Foreign Application Priority Data

Apr. 15, 1983 [IT] Italy ................. 9396 A/83

[51] Int. Cl.$^4$ .................. H02K 29/02; H02K 1/22
[52] U.S. Cl. .................................. 318/254; 318/138; 310/68 R; 310/268
[58] Field of Search ............... 310/46, 68 R, 198, 213, 310/207, 206, 268; 318/254, 138, 254 A

[56] References Cited

U.S. PATENT DOCUMENTS

| 4,088,908 | 5/1978 | Gumen et al. ................ 318/254 X |
| 4,361,776 | 11/1982 | Hayashi et al. ............ 310/68 R X |
| 4,484,097 | 11/1984 | Kanayama et al. ............... 310/268 |

FOREIGN PATENT DOCUMENTS

| 2833028 | 2/1979 | Fed. Rep. of Germany ...... 318/138 |
| 55-111689 | 8/1980 | Japan ................................. 318/254 |
| 55-13633 | 10/1980 | Japan ................................. 310/268 |
| 56-121359 | 9/1981 | Japan ................................. 310/268 |
| 57-196858 | 12/1982 | Japan ................................. 310/268 |
| 57-202866 | 12/1982 | Japan ................................. 310/268 |
| 577246 | 6/1976 | Switzerland . |
| 632878 | 10/1982 | Switzerland . |

Primary Examiner—William M. Shoop, Jr.
Assistant Examiner—Bentsu Ro
Attorney, Agent, or Firm—Robert E. Burns; Emmanuel J. Lobato; Bruce L. Adams

[57] ABSTRACT

A d.c. motor has a disc-shaped rotor carrying permanent magnets having their magnetic axes parallel to the motor shaft and on both sides of the rotor fixed armatures, each armature comprising a rosette-shaped, flat lap armature winding in which the coils partially overlap each other, a slotless iron ring having a flat face to which the coils are fixed, and a connection ring divided into insulated segments receiving the ends of the coils adapted to be energized separately by means of an electronic commutation circuit controlled by a rotary encoder, the groups of segments to which the ends of the coils which are to be energized in parallel are connected, being interconnected by conducting wires extending along the ring. All the component elements of the armature are embedded in plastic material and constitute a compact assembly. If desired, the winding may be of the wave winding type.

8 Claims, 20 Drawing Figures

|   | g1 | g2 | g3 | g4 | g5 | g6 | g7 | g8 |
|---|----|----|----|----|----|----|----|----|
| 1 | +  | 0  | 0  | 0  | –  | 0  | 0  | 0  |
| 2 | 0  | +  | 0  | 0  | 0  | –  | 0  | 0  |
| 3 | 0  | 0  | +  | 0  | 0  | 0  | –  | 0  |
| 4 | 0  | 0  | 0  | +  | 0  | 0  | 0  | –  |
| 5 | –  | 0  | 0  | 0  | +  | 0  | 0  | 0  |
| 6 | 0  | –  | 0  | 0  | 0  | +  | 0  | 0  |
| 7 | 0  | 0  | –  | 0  | 0  | 0  | +  | 0  |
| 8 | 0  | 0  | 0  | –  | 0  | 0  | 0  | +  |

COMMUTATORLESS D.C. MOTOR WITH ELECTRONIC COMMUTATION

BACKGROUND OF THE INVENTION

The present invention relates to a commutatorless direct-current motor and has specific reference to a d.c. motor of this type wherein the commutation is performed electronically, such motor comprising on the one hand at least one disc-shaped rotor provided with a plurality of permanent magnets of which the axes extend either parallel to the motor axis or slightly askew with respect to the motor axis, and on the other hand a fixed armature provided with an armature winding and mounted on one side of said rotor, the armature winding coils being adapted to be energized under the control of an encoder rotatably solid with the motor shaft, through an electronic commutation circuit.

THE PRIOR ART

Direct-current motors of this type, operating without brushes and without commutator, and wherein the energization of the fixed winding is controlled by a member rigidly coupled to the motor shaft, are already known, for example through the Swiss Pat. No. 632,878. A direct-current motor comprising a multi-phase armature winding and an electronic commutation device controlled by Hall generators is disclosed for example in the Swiss Pat. No. 577,246. However, this last-mentioned reference document does not describe the mechanical construction of the stator and rotor.

A common feature of hitherto known d.c. motors having electronic commutation means lies in the fact that the armature winding comprises coils constructed according to the rotating field principle. These coils are energized sequentially as a function of the rotor position so as to generate said rotating field. Therefore, in this case the motor is not a direct-current one in the conventional meaning of the term; however, the term "d.c. motor" is currently used because these motors are supplied with a direct voltage converted by a suitable electronic device into the alternating voltage necessary for generating the rotating field.

SUMMARY OF THE INVENTION

It is the primary object of the present invention to provide an electronic-commutation d.c. motor operating typically like a real d.c. motor and adapted to be substituted without any change for the other d.c. motors of the conventional commutator and brush type.

This object is attained by the fact that the armature winding is a lap winding (also termed imbricated or overlapping winding), or a wave series winding (also termed series rippled winding) mounted in the fashion of a d.c. motor winding.

At the same time, it was endeavored to provide a d.c. motor comprising a stator of particularly simple design and reduced overall dimensions, which is not only adapted to be manufactured in a simple manner but also capable of imparting to the motor a high degree of performance with a very satisfactory efficiency, and wherein the amount of copper constituting the stator winding or the diameter of the stator wires is not limited by the dimensions of the armature slots.

For this purpose, and according to a preferred form of embodiment of the present invention, the armature winding has substantially the shape of a flat rosette comprising a plurality of coils partially overlapping each other, said coils being mounted on the substantially flat face of a slotless armature iron consisting of a ring coaxial to the rotor axis, said ring consisting preferably of a coiled magnetic metal band coated with a layer of insulating material. Preferably, the armature comprises a connection ring coaxial to the motor shaft and divided into segments electrically insulated from one another and connected to the ends of the coil wires, the number of said segments being at least equal to the number of coil wire ends to be connected separately from one another, all of the segments which connect the coils to be energized separately being provided with an outlet for connecting the output leads to the commutation circuits through the stator casing. The armature winding, the connection ring and the armature iron are partially embedded by molding in a mass of synthetic material to constitute a compact prefabricated unit or module, the armature winding being disposed preferably on the armature iron side facing the rotor.

In the case of an imbricated or overlapping winding, the number of coils is preferably a multiple of the number of pairs of poles disposed on one side of the rotor and all the coils which are to be energized simultaneously in parallel are connected in parallel in the armature through suitable wiring means. Preferably, the input end of a coil and the output end of another coil are connected to each segment of the connection ring so as to connect all of the coils in series, the groups of segments of the connection ring to which the ends of coils which are to be energized in parallel are connected, being interconnected by conducting wires extending preferably along an arcuate path along the connection rings, preferably in a groove of said ring, and are embedded in said synthetic material, one segment of each group of segments of the connection ring being provided with said outlet, said segment being preferably longer than the other segments.

Thus, a compact, flat d.c. motor with electronic commutation is obtained, and if necessary its winding may comprise a relatively great number of commutation points corresponding in the case of a conventional motor to a great number of commutator blades. The motor of this invention is adapted to be used in many different ways as a positioning motor.

DESCRIPTION OF THE PREFERRED EMBODIMENTS

Figure 1:
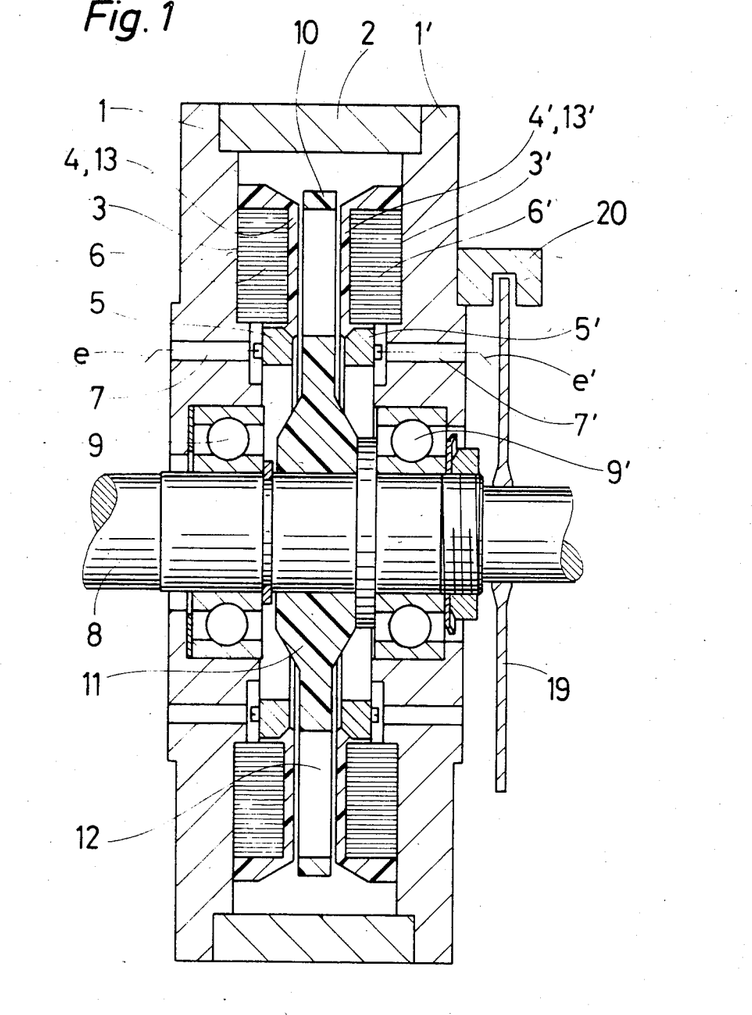
FIG. 1 is an axial section taken across a first form of embodiment of the motor of this invention.

The motor illustrated in FIG. 1 comprises on one hand two stator halves disposed symmetrically on either side of a disc-shaped rotor 10, stator half consisting each of an aluminium flange 1,1', and on the other hand an armature 3,3' secured to the inner face of the corresponding flange 1,1', respectively. The two flanges 1 and 1' are interconnected by a cylindrical ring 2 so as to constitute a casing.

Figures 2, 3:
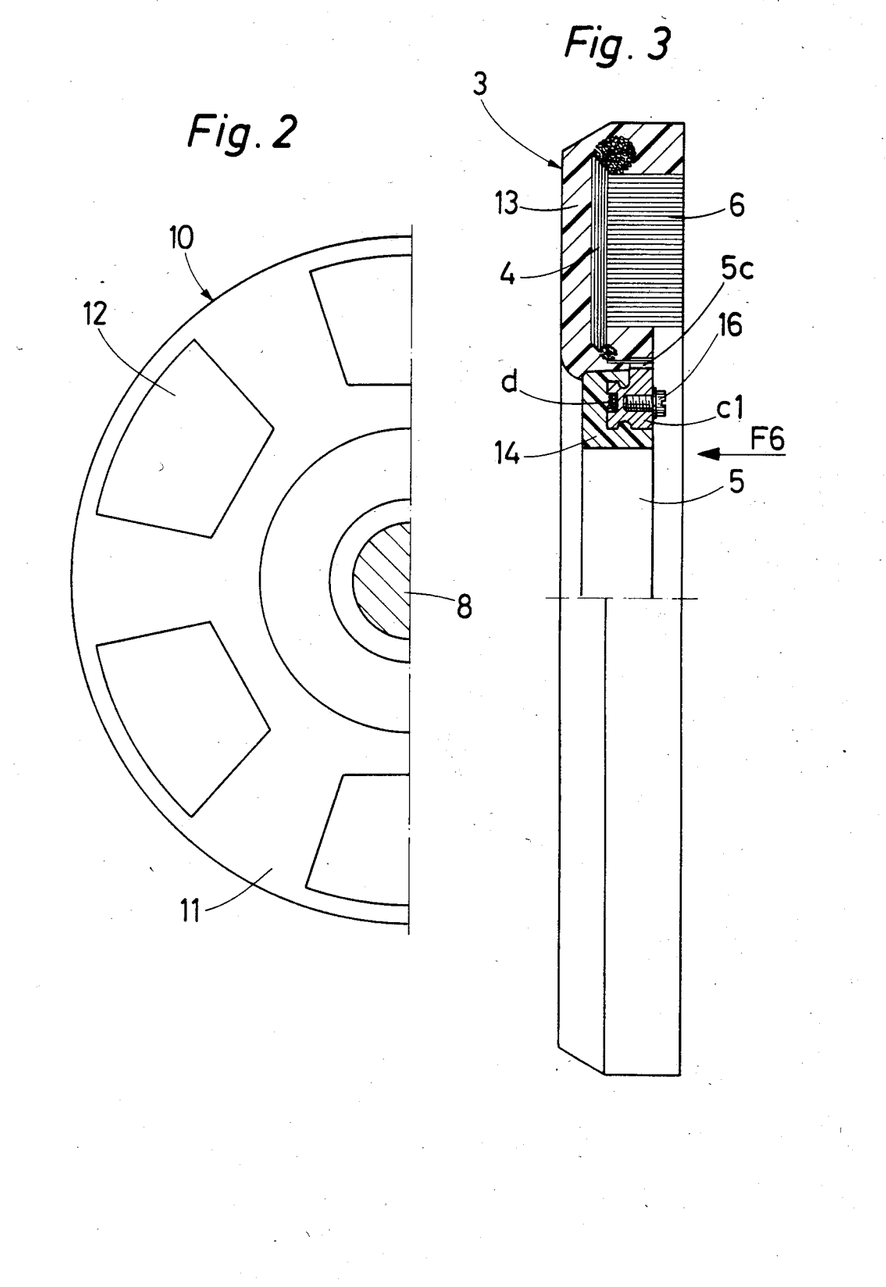
FIG. 2 is a half plan view from above of the rotor of the motor of FIG. 1.
FIG. 3 is an axial half-section taken on a larger scale across one of the armatures of the motor illustrated in FIG. 1.

As shown in FIGS. 1 and 3 of the drawings the armature 3 consists of an armature winding 4 in the form of a basket weave coil and of an annular armature iron lamination 6, both embedded in a suitable first insulating plastic material 13, and also of a connection ring 5 disposed coaxially in the inner cavity of these two component elements and partially embedded in another mass 14 of suitable plastic material having its outer peripheral portion embedded in turn in said first plastic material 13. The thus formed armature 3 constitutes a compact unit of which the manufacture will be desceibed more in detail presently. The armature iron lamination 6 is obtained by coiling a band of magnetic sheet to constitute an annular pack of sheets, and the armature winding 4 is disposed on the side thereof which faces the rotor 10. The other armature 3' has the same configuration consisting of elements 4', 5' and 6' with the same and corresponding plastic materials 13' and 14'.

The connection ring 5 or 5' to be likewise described more in detail presently is divided into a plurality of segments insulated from one another and having their ends connected to the coils constituting the armature winding 4 or the armature winding 4', respectively. Electric conductors, e,e' (FIG. 1) connecting the connection rings 5,5' to the external electronic commutation circuit means are secured by screws 16 to the corresponding segments, as illustrated in FIG. 3 in the case of segment c1, and extend through passages 7,7' respectively, parallel to the motor axis in flange 1,1' respectively. Said electronic commutation circuit means are responsive to a rotary encoder of a type known per se which comprises an encoder disc 19 secured to the shaft 8 and photo-electric means 20 comprising light-emitting means such as photodiodes and pick-ups, the encoder disc comprising notches and having its outer peripheral portion movable in the gap left between the emitter and receiver means.

The construction and connection of the coils constituting the armature winding 4 or 4' will be described more in detail presently with reference to FIGS. 1,6 and 12 of the drawings.

The flat disc-shaped rotor 10 is for instance shrunk on the motor shaft 8 and consists of a mass or body 11 of synthetic resin having a hub-forming central reinforcement. In the example illustrated and disclosed herein six permanent magnets 12 having the shape of ring segments are embedded in the rotor body 11, for example by being incorporated in a carbon fibre support provided with corresponding recesses, the assembly being embedded in turn in the mass of synthetic resin whereby the hub is rigidly secured to the motor shaft 8. Preferably, the magnetic axes of the permanent magnets consisting of a samarium-cobalt alloy are parallel to the motor shaft 8 and therefore the magnetic fields are also parallel to this shaft 8. The thickness of the permanent magnets 12 (having their pole faces free on both sides) is slightly greater than the thickness of the portion of the body 11 of synthetic resin which surrounds said magnets. Furthermore, the permanent magnets 12 are spaced at regular angular intervals around the periphery of the rotor 10 and so disposed that on each one of the rotor faces the pole faces which follow each other along the circumference have alternating polarities, so that on each one of the rotor faces there are three pairs of regularly spaced poles.

In the general case there may be p pairs of poles. The permanent magnets 12 are movable in the air gap formed between the side edges of the laminations 6 and 6' of the two stator halves adjacent the rotor, the width of said air gap depending on the thickness of the flat armature coils 4,4' respectively, which are embedded in the synthetic resin 13 and 13', and also on the necessary play between the stator and rotor. The magnetic current loops of the permanent magnets which follow each other along the circumference are closed through laminations 6 and 6', so that the flanges 1 and 1' do not play any magnetic role and may therefore advantageously be made of aluminium, which is advantageous for obvious weight-saving reasons. The laminations 6 and 6' are formed from a single coiled iron band and coated with a layer of insulating material in order to eliminate eddy currents. This iron band has a high magnetic permeability. The laminations 6 and 6' may of course be obtained through other known methods, such as compressing a compound consisting of iron particles and a suitable binder, the iron particles being so oriented that the electrical conductivity in the radial direction is very low or substantially non-existent to prevent the development of eddy currents.

Figure 5:
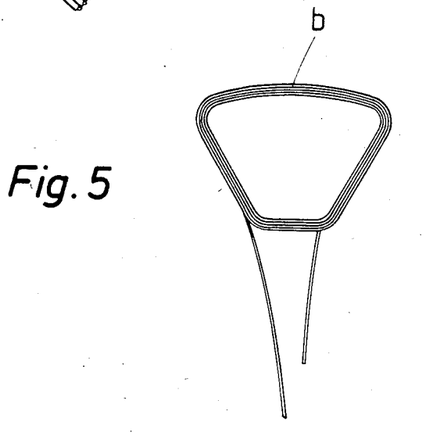
FIG. 5 is a diagrammatic view showing one of the armature winding coils.

Each armature winding 4,4' consists of a lap or imbricated winding such as currently used in conventional d.c. motors; more particularly, it comprises partial coils or windings partially overlapping each other in the known fashion to constitute a rosette-shaped armature winding (FIG. 5). There are n=2pm coils, wherein p is the even number of pole pairs on one side of the rotor and m the number of coils connected in series by means of the electronic commutation circuit means at a given time, or in a predetermined position of the rotor, said coils cooperating temporarily with the adjacent poles of a pair of rotor poles moving past said coils. In the example illustrated p=3 and m=4, whereby each armature winding consists of 24 coils denoted b1 and b24 in FIGS. 6 and 12. To simplify the drawing, in these FIGS. 6 and 12 the coils are shown only diagrammatically by a single turn as customary in the art. In actual practice, each coil comprises of course several turns, one of said coils being shown at b in FIG. 5. The distance between the two faces of each coil which cross radially the permanent magnetic field is equal to a polar division, i.e. equal to the distance between the centres of poles of two circumferentially adjacent permanent magnets, which in the example illustrated corresponds to a 60-degree angular displacement, as shown notably in FIG. 12, showing diagrammatically the six poles of the permanent magnets 12 disposed on one side of the rotor. Thus, when current flows through one coil, the current direction in the areas of the two adjacent poles are opposite.

The example illustrated relating to a rotor comprising six permanent magnets and an armature winding comprising only 24 coils (m=4) is selected in order to avoid a complicated description of the winding and facilitate the understanding of the assembly. However, in actual practice a higher number of coils will be used, for example m=8, i.e. 48 coils.

Figure 10:
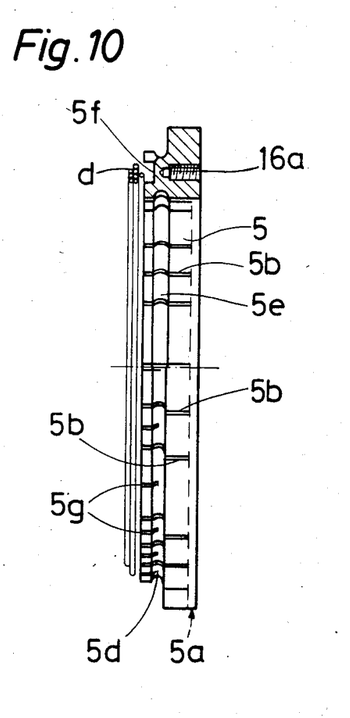
FIG. 10 is a side elevational and part-sectional view of the connection ring of FIG. 9, showing partially the conducting wires before the fixing thereof between the proper segments.

The separate coils are wired by means of the connection ring 5 of which the manufacturing method will be discussed presently. This ring 5 is divided (FIG. 6) into as many mutually insulated segments as there are coils in the armature winding, that is, into 24 segments c1 to c24 in the example illustrated. These segments, made of a suitable conducting material, notably copper, are separated by radial slots 5b filled with synthetic resin in order to hold together the segments in the form of a connection ring 5, as will be explained more in detail presently. The axial sections of FIGS. 3,10 and 11 show the profile of connection ring 5, and of one of its segments c1, respectively. In the outer edge of each segment a slot 5c is formed for wedging therein the ends of corresponding coils. Moreover, the connection ring 5 is provided, on a portion of slightly smaller diameter adjacent its portion comprising the notches 5c, a first peripheral annular groove 5d (FIG. 10), a second annular groove 5e on its inner circumference and a third groove 5f on its lateral surface facing the rotor in the assembled condition.

Figure 6:
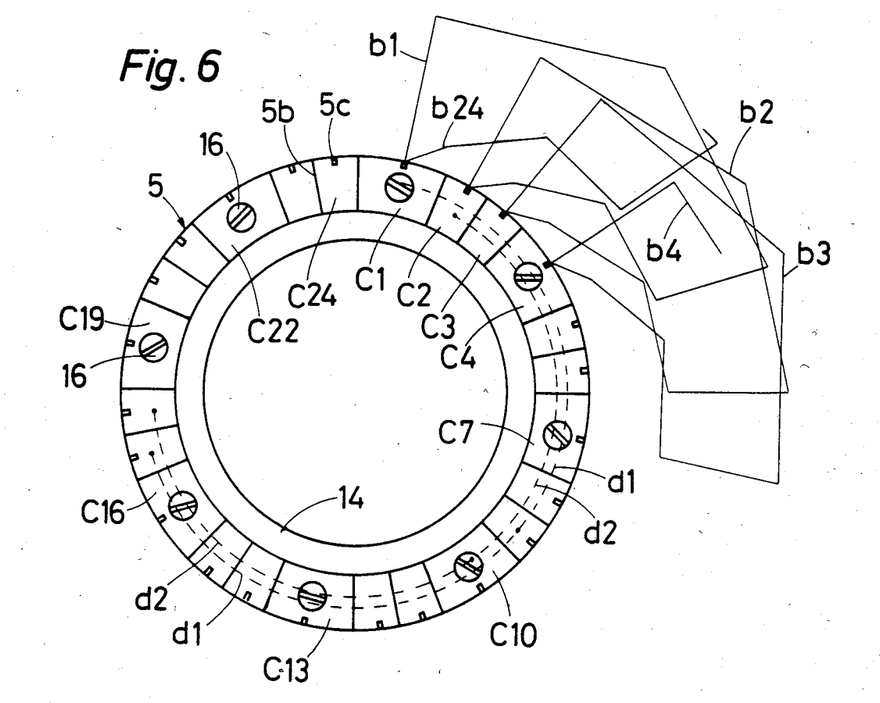
FIG. 6 is a view taken in the direction of the arrow F6 of FIG. 3, from above the armature connection rings with said segments, to which the stator winding is connected, some of the stator coils being shown diagrammatically, save the other component elements of the armature.
Figures 11, 12:
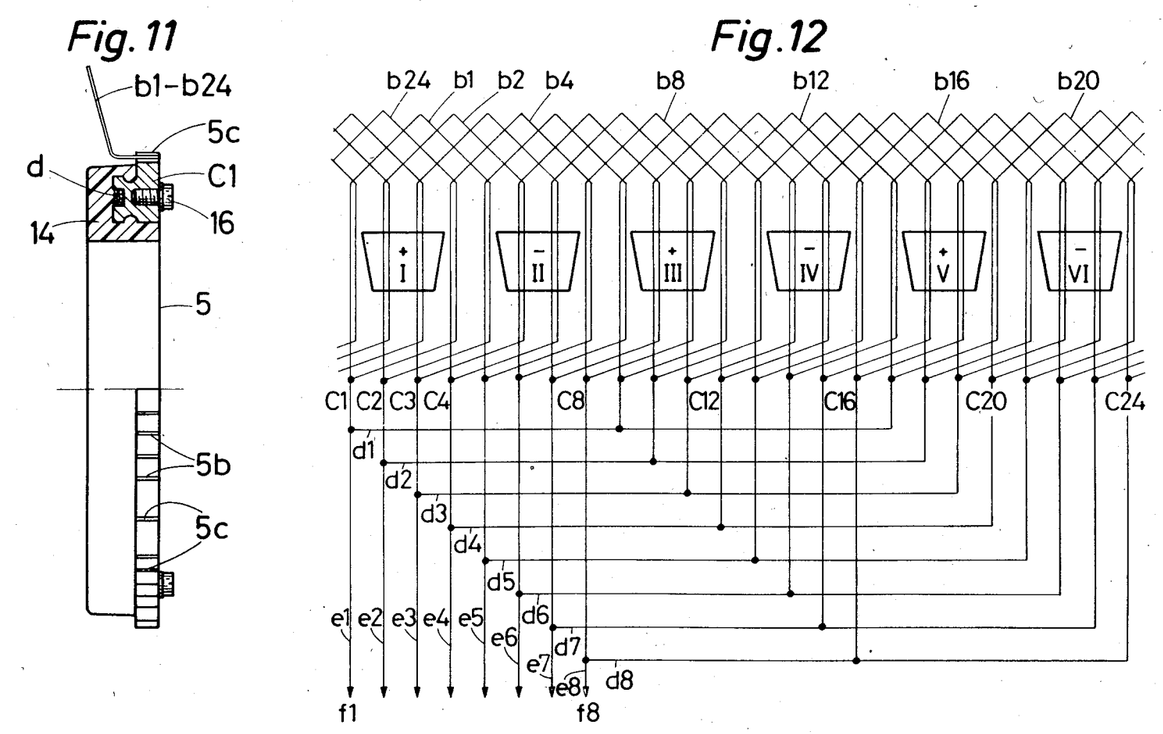
FIG. 11 illustrates in part-elevational, part-sectional view the connection rings of FIG. 10, after the fixing of the conducting wires, the molding thereof in the mass of synthetic material, and the final machining step with the coil ends connected to segment C1.
FIG. 12 illustrates diagrammatically the arrangement of the stator winding coils.

As clearly shown in FIG. 12, the two ends of each coil are connected to the two adjacent segments of the connection ring, the end of coil b24 and the beginning of coil b1 being connected to the same segment c1, as shown in FIG. 6, these two coil ends being fixed together by wedging them in the corresponding notch 5c (FIG. 11). The beginning of coil b2 and the end of coil b1 are connected together to segment c2, and the end of coil b2 and the beginning of the next coil b3 are connected together to the adjacent segment c3, and so forth. All the coils having the same position with respect to a pair of poles, i.e. which are spaced angularly from each other by the distance corresponding to two polar divisions, are energized in the same direction and consequently connected in parallel. Thus, as shown in FIG. 12, in each one of the eight groups of three coils, the first, second and third coils are connected in parallel: b1-b9-b17; b2-b10-b18; ... b8-b16-b24.

Figure 7:
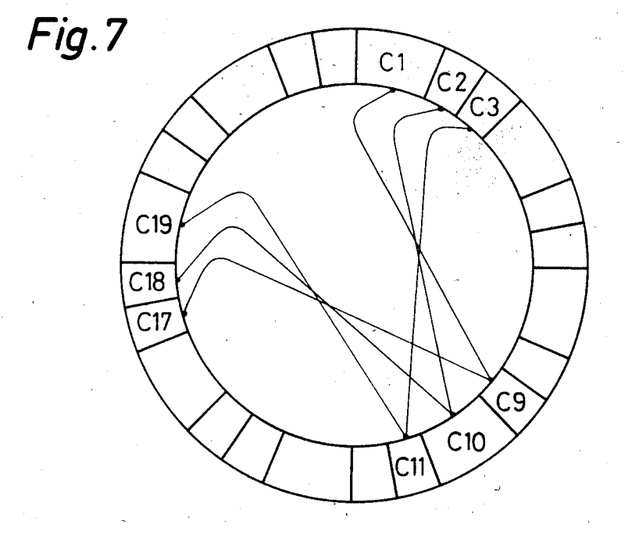
FIG. 7 is a diagrammatic plane view from above of the connection ring of FIG. 6, in which the conducting wires interconnecting the segments are shown diagrammatically.

To simplify the circuit arrangement and the commutation functions of the electronic commutation circuit which control the coil energization, the above-mentioned parallel connections are fixedly wired in the connection ring 5. The three segments constituting the connections for the input ends or the output ends are interconnected by conducting wires. Thus, segments c1, c9 and c17 are interconnected by wire d1, segments c2, c10 and c18 are interconnected by wire d2, and so forth, and finally segments c8,c16 and c24 are interconnected by wire d8, as shown in the wiring diagram of FIG. 12 for the eight conductors d1 to d8 and in the diagrammatic illustration of the connection ring shown in FIG. 7 for wires d1,d2 and d3 through lines passing through the centre of the connection ring.

In the practical embodiment of the present invention the connecting conducting wires are advantageously guided on the face of the connection ring which faces the rotor, along the ring wall, in groove 5f, as illustrated in the case of wires d1 and d2 in FIG. 6 and for some of these wires in FIGS. 3 and 11, where these wires are designated by the reference letter d. They are either welded to the relevant segments before completing the connection ring, which will be described presently, and before connecting the coils, or secured by wedging in openings or notches provided for this purpose. The connection ring is then embedded in the synthetic resin 14 by using a suitable mold in its inner circumference and on its face provided with groove 5f with the wires d, the synthetic resin filling simultaneously the radial grooves 5b formed between adjacent segments as described in a later portion of this specification.

Due to the above-described connections of each three segments inside the connection ring 5, only 24/3=8 connections are controllable separately and have to be led out through eight conductors e1-e8. To permit a convenient connection of these eight conductors with the connection ring, each third segment of the connection ring has a width equal to twice the width of the other segments and comprises a screw 16 for connecting the output wire. In the example illustrated in FIG. 6 these specific segments are segments c1,c4 ... ,c22 which comprise connecting screws 16 also shown in FIGS. 3 and 11 of the drawings. In the assembled condition of the d.c. motor, conductors e1 through e8 leading to the outside (FIG. 12) are directed and guided to the outside (as already mentioned in the foregoing) via a passage 7 formed through the corresponding stator flange 1 as shown in FIG. 1 for conductor e and on the opposite side by means of a conductor d' passing through another passage 7'.

Figure 13:
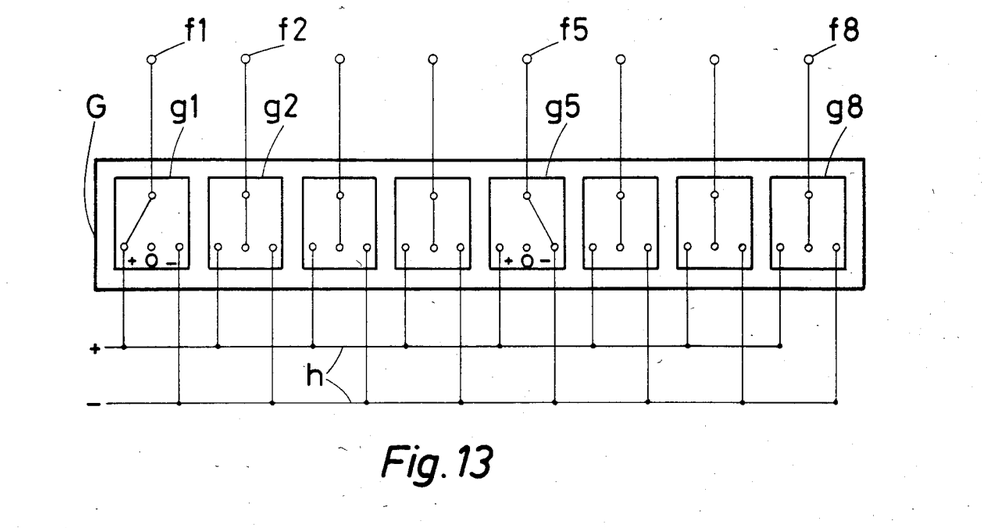
FIG. 13 illustrates also diagrammatically the principle of the electronic commutation circuit with the conductors from the connection ring.

The external terminals of conductors e1-e8 are designated by reference symbols f1 to f8 in FIG. 12 and, according to the wiring diagram of FIG. 13, connected to three-way switches g1-g8 incorporated in the electronic commutation circuit G. An electronic commutation circuit in which the electronic switches operate with controlled transistors and other semiconductors is already known per se and is not to be regarded as constituting an object of the present invention. This electronic commutation circuit is mentioned herein only for facilitating the understanding of the mode of operation of the motor, or the description of the series energization of the armature winding coils. The mode of operations of each one of the electronic switches g1 to g8 is the same as that of a three-way switch of which the movable contact arm is adapted to be set in three different position: in the first position shown in FIG. 13 for electronic switch g1 the contact arm engages the + terminal connected to the positive conductors of the supply line from the d.c. source h. In the second or intermediate position the contact arm of FIG. 12 for electronic switches g2, g3 g4, g6, g7 and g8, engages terminal 0, and in this case the energization of the corresponding terminals f2-f4 and f6-f8 is discontinued. In the third position the contact arm, as shown in FIG. 13 for electronic switch g5, engages the negative terminal—connected to the negative conductors of supply line h.

In the examples of FIGS. 12 and 13 of the attached drawings the segments c1, c9 and c17 of connection ring 5 are connected via conductor e1 and external terminal f1 and also via the electronic switch g1 to the positive line + of the current supply source, and segments c5, c13 and c21 are connected via conductor e5 and external terminal f5, as well as through electronic switch g5 to the negative line − of the supply, so that the coils are connected as follows: four adjacent coils, disposed in the vicinity of two adjacent poles, are connected in series. These six groups of four comprising each four coils connected sequentially are as follows: in the area of the pair of poles I-II the coils b1-b4, in which the current flows from segment c1 through coils b1, b2, b3 to segment c5; in the area of the pair of poles II-III the coils b5-b8, in which the current flows from segment c9 through coils b8, b7, b6 and b5 to segment c5; in the area of the pair of poles III-IV the coils b9-b12 in which the current flows from segment c9 through coils b9 to b12 to segment c13; in the area of the pair of poles IV-V the coils b13-b16 in which the current flows from segment c17 through coils b16, b15, b14 and b13 to segment c13; in the area of the pair of poles V-VI the coils b17-b20 in which the current flows from segment c17 through coils b17, b18, b19 and b20 to segment c21, and finally in the area of the pair of poles VI-I the coils b21 to b24, in which the current flows from segment c1 through coils b24, b23, b22 and b21 to segment c21. Therefore, in the example discussed herein there are only four coils connected sequentially (m=4) in the area of two adjacent poles, whereas in actual practice 8 coils are preferred (m=8).

Figure 14:
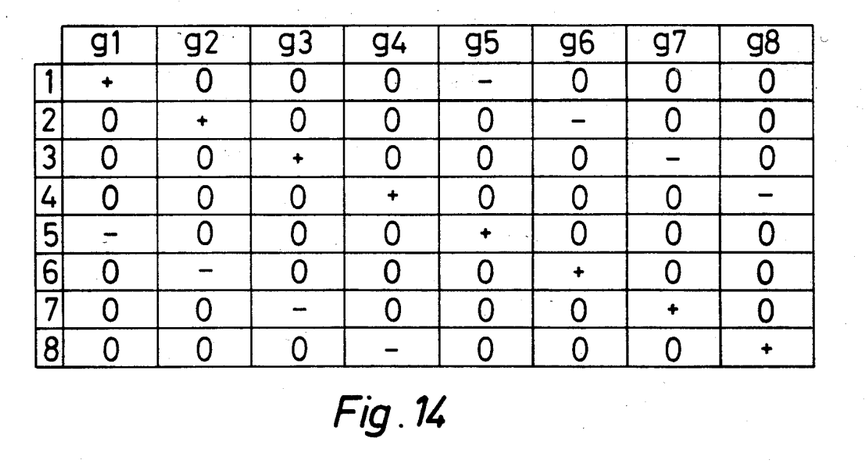
FIG. 14 is a table showing the cycle of a sequence of commutations for energizing an armature winding.

At the end of a 1/24th of revolution angular movement of rotor 10 the encoder controls the commutation circuit G in such a manner that segments c2, c10 and c18 are connected via line e2 and external terminal f2 of electronic switch g2 to the + conductors of supply line h, and segments c6, c14 and c22 are connected via line e6 and external terminal f6 of electronic switch g6 to the negative terminal − of the supply line, whereas all the other segments are disconnected from the supply current source. The groups consisting of four sequentially connected coils will thus move to the right (as seen in FIG. 12) of a coil. After another angular movement of the rotor corresponding to 1/24th of a revolution the following switching step takes place in a similar way, and so forth, and after one-third of revolution of the rotor, i.e. after eight switching movements, the above-described cycle is repeated. The table of FIG. 14 illustrates the eight different switching cycles of electronic switches g1 to g8. It will be seen that during the fifth switching cycle from the rotor position shown in FIG. 12, segments c1, c9 and c17 are connected via switch g1 to the negative conductor− of supply line h and that segments c5, c13 and c22 are connected to the positive conductor + of supply line h through switch g5, so that after one-sixth of a revolution of the rotor all the coils are energized in the reverse direction. Under these conditions, during a complete revolution of the rotor the above-described cycle is repeated three times.

All the electronic switches g1 to g8 of the commutation circuit G are controlled, in a manner known per se, by the rotary encoder operating synchronously with the rotor, as a function of the angular position of the rotor, as already mentioned hereinabove with reference to FIG. 1. This rotary encoder is of the photo-electric type and comprises in the present example eight emitter-receiver units disposed along a circular arc and the disc comprises three notches disposed at 120-degree intervals from each other so that during each complete revolution of the motor shaft the electronic circuit G is switched 3×8=24 times. However, an induction encoder, or a well-known Hall-effect generator or any other type of encoder may also be used.

The method of manufacturing an armature 3 or 3', with its various component elements will now be described in detail. The coils of an armature winding 4,4' are wound continuously by using a known winding machine (cf.French Pat. No. 2,471,074) to a rosette configuration from a conducting wire coated with a synthetic resin lacquer. Thus, the connections between the coils wound in overlapping relationship are located centrally of the rosette and the length of the wire section constituting this connection, folded several times in the central space of the rosette, is such that subsequently, when the coils are separated, the wire ends project from the coils sufficiently to permit the proper wiring thereof. The complete winding is then subjected to a current strong enough to soften the synthetic resin coating the wire and then, when the winding has cooled down, the insulating coatings of the adjacent wires adhere to each other. Thus, a rigid, self-supporting winding is obtained in the form of a basket weave coil of which the outer peripheral area comprising a great number of wire sections extending in the circumferential direction, namely the external superposed sides of the coils, provides an extra thickness in the form of a bead partially folded on one side.

Figure 4:
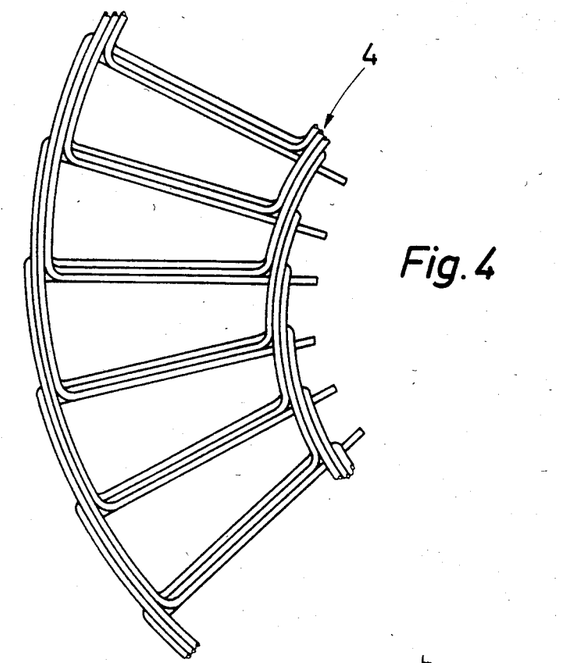
FIG. 4 is a fragmentary diagrammatic view of a part of the armature winding.

The next step consists in separating all the coils from one another, the coil ends lying in the central area of the rosette, by cutting the wire sections still interconnecting the coils, or separating the coil interconnections, to provide a rosette as shown in FIG. 4.

Figure 8:
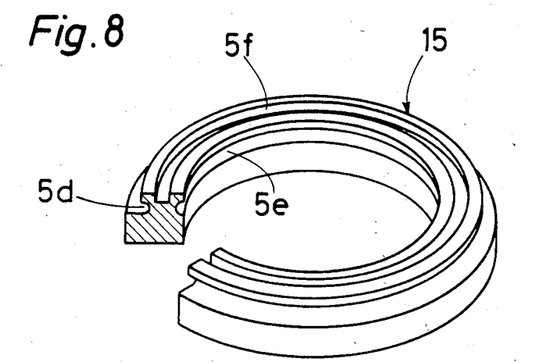
FIG. 8 is a perspective view showing a partially machined connection ring blank.
Figure 9:
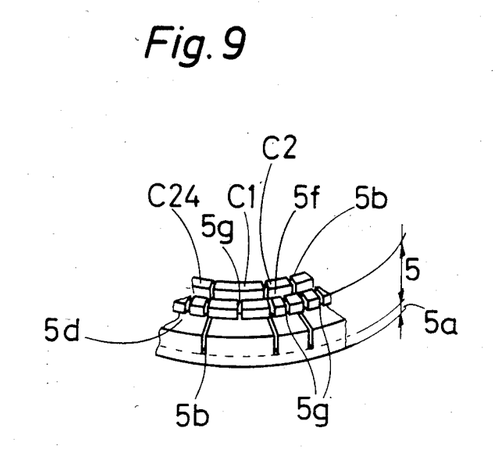
FIG. 9 is a fragmentary perspective view of a connection ring during a subsequent machining step.

The connection ring 5,5' is manufactured as follows: initially, an annular copper blank 15 is provided (FIG. 8) and the desired profile is imparted thereto by turning or milling to form the grooves 5d, 5e and 5f mentioned in the foregoing description and illustrated in FIG. 8. Then the radial slots 5b are formed as shown in FIG. 9 by milling the side in which the annular groove 5f is formed, to a depth such that an area 5a having a thickness of about one or a few millimeters is left on the ring side opposite the groove 5f, for preserving the necessary strength of the connection ring with its segments c1, c2 . . . c24 thus formed. Then other radial slots 5g shallower than slots 5b are milled in the centre of each segment c1, c2, . . . c24, for receiving and fixing the conducting wires d provided for connecting the above-described pair of segments to the relevant segments, said wires d being disposed along a circular arc in said groove 5f. FIG. 10 shows in axial section the ring machined according to FIG. 9 and diagrammatically the conducting wires d curved along a circular arc and adapted to be inserted into said groove 5f. The grooves 5g are not shown in FIG. 10.

The connection ring 5 thus completed and provided with its wires d is then introduced into a mold of annular configuration and embedded in a suitable synthetic resin 14 as already disclosed hereinabove. During this operation the conducting wires d are embedded completely in the synthetic resin which fills the groove 5f, and covers at the same time the inner circumference of the connection ring by filling the annular groove 5e and the outer contour of the connection ring, and also the annular groove 5d. Of course, this synthetic resin also fills the radial slots 5b and as it penetrates into the radial and annular slots it provides a reliable binding with the metal ring. Then notches 5c (FIGS. 10 and 11) are cut in the middle of segments c1,c2 . . . c24 and tapped holes 16a (FIG. 10) are drilled in the segments to which to the external connection means will be connected later on. For the sake of convenience, the notches 5c and holes 16a are shown on ring 5 of FIG. 10 but as already mentioned they are formed in fact only after molding the ring 5 in the mass of synthetic resin 14.

The face of the connection ring which is opposite the groove 5f is then machined until the continuous area 5a free of any radial slots (FIG. 10) is removed so that the separate segments c1, c2 . . . c24 are separated from one another, insulated and no more attached to one another except by the synthetic resin 14 as shown in FIG. 11.

The following manufacturing step consists in securing the armature winding with its coils to the connection ring 5, the ends of the separate coils being fixed to the corresponding segments by wedging said ends in notches 5c, as already described in the the foregoing description. FIG. 11 shows the manner in which one end of coils b1 and b24 is secured in the notch 5b of segment c1. The unit consisting of the connection ring of the armature winding is completed by fitting the fastening screws 16 to the eight segments mentioned hereinabove. Of course, these screws may be fitted before connecting the armature winding to the connection ring.

The last manufacturing step consists in depositing into a suitable mold the assembly comprising the armature winding 4 and the connection ring 5 with the armature iron lamination 6 previously coiled and fitted on the outer face of the coils, i.e. on the coil side facing the stator flange, and embedding this assembly in the mass of synthetic resin 13, as illustrated in FIG. 3. Preferably, the plastic resins 13 and 14 are of the epoxy type. The armature winding is thus embedded completely in a mass of synthetic resin 14 which furthermore covers the entire periphery of the armature iron lamination 6 in the example contemplated herein. The gap left between the outer periphery of connection ring 5 and the coil connecting wires leading to the notches 5c, respectively, the periphery of iron band 6, is filled with synthetic resin 14 up to the level of the outer face of connection ring 5. Thus, a prefabricated, compact armature is obtained which comprises a wired connection ring having the armature winding connected to its segments, and the iron armature ring 6. The last step consists in securing this armature 3 to the inner face of a motor flange 1, after connecting by means of screws 16 the external conductors e to the corresponding segments of the connection ring by introducing said conductors into the corresponding passages 7 formed in the stator flange.

The above-described armature is characterized on the one hand by its novel and rational manufacture and on the other hand in that the coil wires are not disposed as in the past in grooves formed in laminations. The manufacture of the armature iron and the assembling of the armature winding on the iron are thus simplified considerably. Moreover, the limitation of the amount of copper, and or of the thickness of the wires required for winding the armature as a consequence of the size of the grooves formed in the armature laminations, is eliminated. If necessary, it is possible to construct armature windings with an amount of copper, and/or with wires of very different diameters and very different number of turns of the coils, and to overmold directly with a synthetic substance the same prefabricated armature irons with the corresponding connection rings, while dispensing with the fitting of the coil wires into the grooves of the armature laminations, which must be adapted to the wire thickness. Due to the elimination of grooves, this device is characterized by a high rotational smoothness, even at very low speeds.

It will be seen that the motor shown in FIGS. 1 and 2 of the drawings comprises a disc-shaped rotor disposed between two opposite fixed stator windings, so that the assembly comprises in fact two motors having a common rotor.

Figure 15:
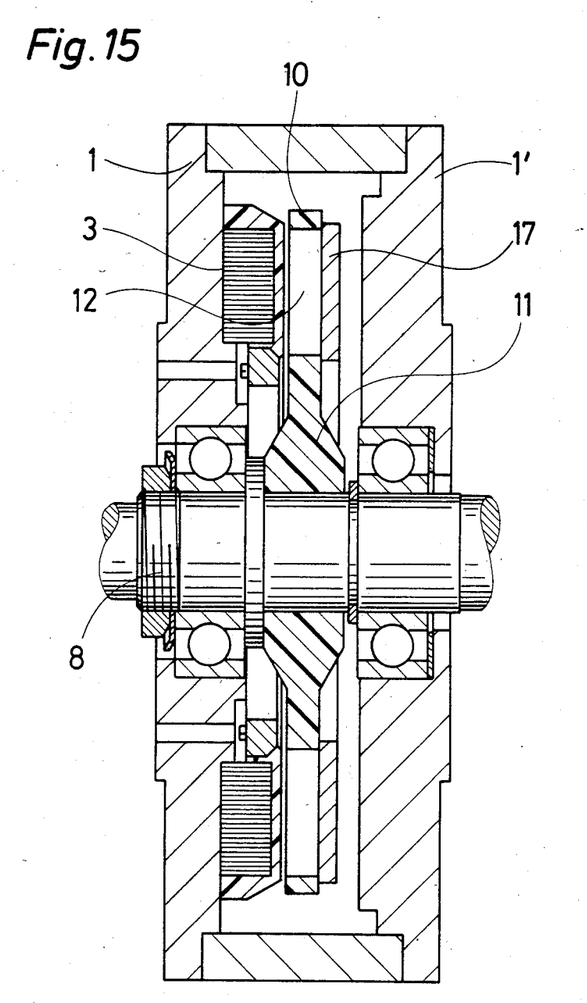
FIG. 15 illustrates a second form of embodiment of a d.c. motor according to the present invention, shown in axial section.

In a simplified form of embodiment of the motor as illustrated in FIG. 15 the motor comprises a single armature 3 mounted on a flange 1 and designed if desired exactly like the armature shown in FIG. 1. The only function of the opposite flange 1' is to close the casing. For closing the loops of the magnetic circuit of the magnetic current of the permanent magnets 12 on the rotor face opposite the armature 3, an iron ring 17 contacting all the poles of the permanent magnets 12 is secured to this rotor face, whereby the magnetic current loop of these magnets is closed through this ring 17. Otherwise, the rotor may be constructed exactly like the one shown in the example of FIGS. 1 and 2.

Figure 16:
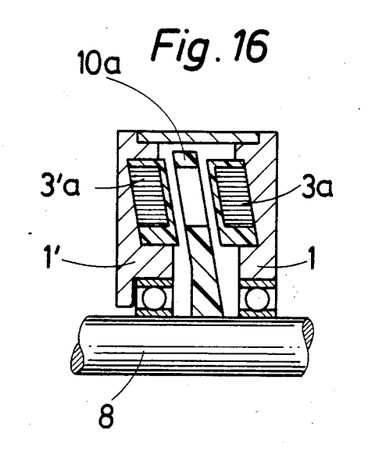
FIG. 16 is a diagrammatic illustration of a third form of embodiment.

According to another modified form of embodiment of the d.c. motor of the present invention, illustrated diagrammatically in FIG. 16, the rotor 10a may be slightly tapered to a dished configuration, and the two armatures 3a and 3'a disposed on either side thereof may have a shape consistent with the rotor configuration, i.e. with conjugate and opposed tapers.

Figure 17:
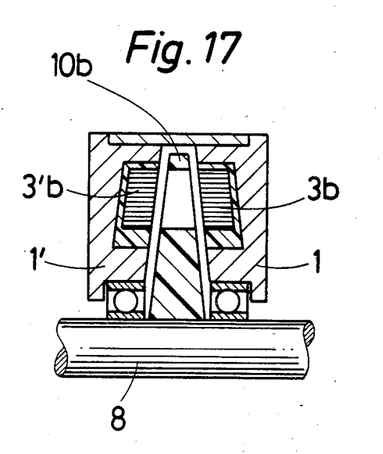
FIG. 17 illustrate diagrammatically a fourth form of embodiment.

In the alternate form of embodiment illustrated also diagrammatically in FIG. 17, the rotor 10b is biconical and the taper of the two armatures 3b and 3'b disposed on either side of the stator flanges 1 and 1' is consistent with that of the two rotor faces, i.e. inclined with respect to the motor shaft 8.

The rotor taper shown in FIGS. 16 and 17 imparts a greater rigidity to the assembly, to avoid firstly a displacement of the permanent magnets strongly urged in the axial direction by the stator iron. Moreover, in the biconical arrangement of FIG. 17, the main mass of the rotor 10b is nearer to shaft 8, so that its inertia is reduced accordingly.

Figure 18:
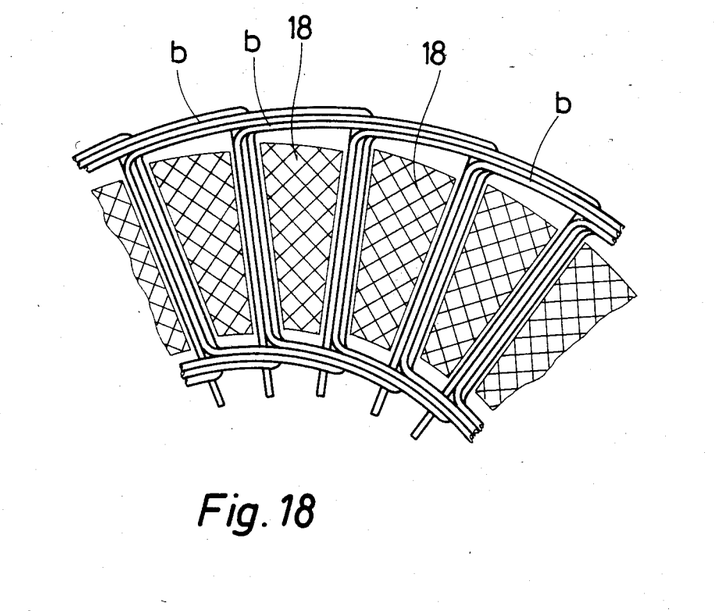
FIG. 18 illustrates a modified form of embodiment of the armature winding.

In a particularly advantageous form of embodiment of an armature for a motor according to the instant invention, the wedge shaped gaps, in the form of ring segments (FIG. 18), left between the radially extending sides of the separate coils b are filled by wedge-shaped elements 18 or sectors of ferromagnetic material, before overmolding the armature in synthetic material. These elements 18, when seen in the direction of the motor axis, are nearly as thick as the armature winding itself and thus reinforce the armature field while reducing the air gap by a value corresponding roughly to the thickness of the armature winding. If on the other hand it is desired to keep the armature field to a constant value, thinner permanent magnets may be used by resorting to armature irons 18 for filling the empty spaces of the coils, so as to reduce proportionally the inertia of the rotor. The armature irons 18 may advantageously consist in a manner known per se of a special iron powder which, when mixed with an adhesive substance, and subsequently shaped under pressure so that the conductivity in the radial direction is very low and thus prevents the generation of eddy currents.

Motors constructed according to the teachings of the present invention may be extended in such a manner that one or several disc-shaped rotors having if necessary different functions are mounted on a same and common shaft. The rotor, for example, in addition to its motor function, may at the same time constitute one member of a mechanical brake, of a tachometric generator, of an encoder for controlling the electronic commutation, and other similar applications. These various functions may also be accomplished by using special discs.

Figure 19:
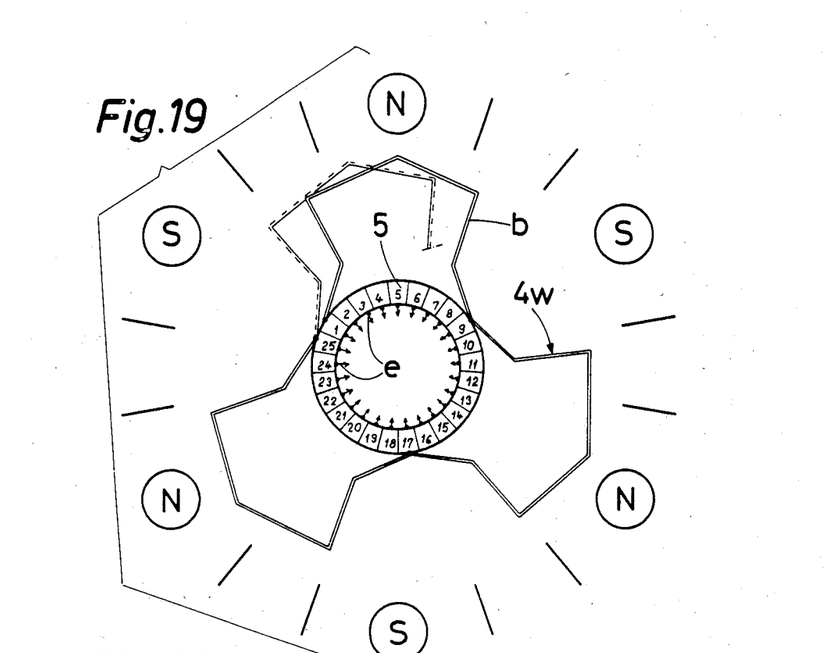
FIGS. 19 and 20 illustrate the wiring diagrams of a wave winding with its connection ring.
Figure 20:
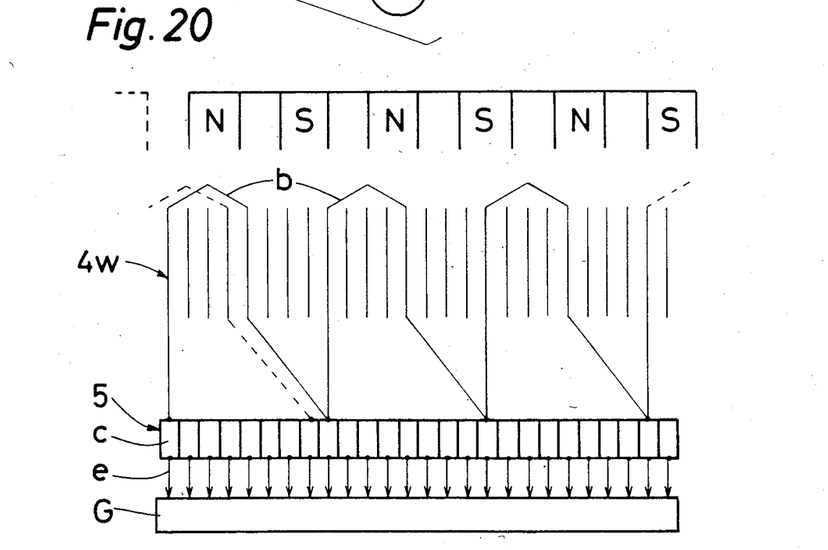

The present invention should not be construed as being strictly limited by the specific forms of embodiment described herein with reference to the attached drawings, since it also covers any modified versions and constructions thereof, and all changes brought to the configuration of the motor and/or the armature and its winding, provided that they remain within the ambit of the invention. Thus, it is also possible, for example, instead of the lap or imbricated armature winding described in the specification, to use a wave series armature winding as customary in conventional d.c. motors, for example as shown in FIGS. 19 and 20 of the drawings which correspond to the form of embodiment of FIGS. 6 and 12, respectively. Whereas in a lap winding the coils disposed close to each other and side by side are commuted in series, in a wave winding it is the coils separated by about twice a polar division that are commuted in series. In the example discussed herein with reference to FIGS. 19 and 20 the wave winding 4W comprises 25 coils b connected in the fashion shown for the connection ring 5 which comprises 25 segments c. The inner conducting wires of the connection ring are dispensed with and each segment c of this ring is connected to an external conductor e so as to be switched separately by an electronic commutation device G.

What is claimed is:

1. A commutatorless direct-current motor comprising:
   a shaft,
   a disc-shaped rotor comprising a plastic body mounted on said shaft and a plurality of permanent magnets embedded in said plastic body with their magnetic axes disposed at least approximately parallel to said shaft,
   at least one stator comprising a fixed flat, slotless armature lamination iron comprising a band of magnetic sheet material covered with an insulating layer and coiled into an annular pack, an armature winding comprising a plurality of overlapping wedge-shaped coils mounted on a flat face of said armature lamination iron facing said rotor, a segmented connection ring with which said coils are connected and insulating plastic material embedding said coils and connection ring and bonding them to said armature lamination iron, and,
   an encoder electrically connected with said coils through said connection ring and having a rotary portion fixed with said connection ring and having a rotary portion fixed with said shaft for controlling sequential energization of said coils.

2. A commutatorless direct-current motor according to claim 1, in which wedge-shaped sectors of ferromagnetic material are inserted in said coils and are embedded in said insulating plastic material.

3. A commutatorless driect-current motor according to claim 2, in which said wedge-shaped sectors have a thickness almost as great as that of said coils.

4. A commutatorless direct-current motor according to claim 1, in which groups of said coils are connected in series with one another by having two ends of adjacent coils connected with the same segment of said segmented connection ring.

5. A commutatorless driect-current motor according to claim 4, in which the number of said coils is a multiple of the number of said permanent magnets and the number of said groups is equal to the number of said permanent magnets.

6. A commutatorless driect-current motor comprising:
   a stator comprising spaced discs of non-magnetic material connected with one another at their outer peripheries, an armature on the inner face of each of said discs, each of said armatures comprising a flat slotless armature lamination iron mounted on an inner face of the respective disc and comprising a band of magnetic sheet material covered with an insulating layer and coiled into an annular pack, an armature winding comprising a plurality of overlapping wedge-shaped coils mounted on an inner flat face of said armature laminating iron, a segmented connection ring with which said coils are connected and insulating plastic material embedding said coils and connection ring and bonding them to said armature lamination iron,
   a shaft rotatably supported in and extending between said discs,
   a disc-shaped rotor disposed between said armatures and comprising a plastic body mounted on said shaft and a plurality of permanent magnets embedded in said plastic body with their magnetic axis disposed at least approximately paralled to said shaft, and an encoder electrically connected with said coils through said connection ring and having a rotary portion fixed with said shaft for controlling sequential energization of said coils.

7. A commutatorless direct-current motor according to claim 6, in which said rotor is dished and said armatures are correspondingly dished to conform with said rotor.

8. A commutatorless direct-current motor according to claim 6 in which said rotor is biconical and said armatures are dished to conform with said rotor.

* * * * *